(12) United States Patent
Eggleton et al.

(10) Patent No.: US 6,996,317 B2
(45) Date of Patent: Feb. 7, 2006

(54) OPTICAL DEVICES INCLUDING MICROSTRUCTURED FIBER SECTIONS DISPOSED FOR TRANSVERSE SIGNAL PROPAGATION

(75) Inventors: Benjamin J. Eggleton, Camperdown (AU); Mikio Ogai, Atlanta, GA (US); Mikhail Sumetsky, Bridgewater, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 0 days.

(21) Appl. No.: 10/691,947

(22) Filed: Oct. 23, 2003

(65) Prior Publication Data

US 2005/0089287 A1  Apr. 28, 2005

(51) Int. Cl.
*G02B 6/20* (2006.01)

(52) U.S. Cl. .................. 385/125; 385/126; 385/141

(58) Field of Classification Search ........ 385/123–128, 385/141–145
See application file for complete search history.

(56) References Cited

U.S. PATENT DOCUMENTS

| | | | |
|---|---|---|---|
| 5,526,449 A | 6/1996 | Meade et al. | |
| 5,802,236 A | 9/1998 | DiGiovanni et al. | |
| 6,058,127 A | 5/2000 | Joannopoulos et al. | |
| 6,075,915 A * | 6/2000 | Koops et al. | 385/125 |
| 6,236,779 B1 | 5/2001 | Kafka et al. | |
| 6,301,420 B1 * | 10/2001 | Greenaway et al. | 385/126 |
| 6,301,421 B1 | 10/2001 | Wickham et al. | |
| 6,317,554 B1 | 11/2001 | Kosaka | |
| 6,381,389 B1 | 4/2002 | Kosaka | |
| 6,389,198 B2 | 5/2002 | Kafka et al. | |
| 6,404,966 B1 | 6/2002 | Kawanishi et al. | |
| 6,418,258 B1 | 7/2002 | Wang | |
| 6,470,127 B2 | 10/2002 | Voevodkin | |
| 6,667,159 B1 * | 12/2003 | Walt et al. | 435/7.32 |
| 6,798,960 B2 * | 9/2004 | Hamada | 385/122 |
| 2002/0181911 A1 | 12/2002 | Mangan et al. | |
| 2003/0231845 A1 * | 12/2003 | Patiakh et al. | 385/125 |

FOREIGN PATENT DOCUMENTS

| | | |
|---|---|---|
| EP | 1168008 | 1/2002 |
| JP | 2002 228868 | 8/2002 |
| JP | 2002-228868 | 8/2002 |

OTHER PUBLICATIONS

Charles Kerbage, Benjamin Eggleton, "Microstructured Optical Fibers for Integrated Tunability of Photonic Devices", Optics and Photonics, OSA, Washington D.C., vol. 13, No. 9, Sep. 2002, pp. 38-42.

Hong Nguyen, Peter Domachuk, Benjamin J. Eggleton, "New Slant on Photonic Crystal Fibers", Optics Express Opt. Society of America, USA, vol. 12, No. 8.

* cited by examiner

*Primary Examiner*—Sung Pak

(57) ABSTRACT

A microstructured optical component is formed from an optical preform fabricated to include one ore more internal regions of differing refractive index. The preform is drawn into a fiber and sliced into relatively long individual fiber segments, each segment thus forming a microstructured optical component. An optical signal may then be coupled through a sidewall of the component in a direction parallel to the endfaces of the segment. A more complex structure can be formed by grouping together a plurality of fiber segments and performing an additional drawing and slicing process.

7 Claims, 6 Drawing Sheets

US 6,996,317 B2

OPTICAL DEVICES INCLUDING MICROSTRUCTURED FIBER SECTIONS DISPOSED FOR TRANSVERSE SIGNAL PROPAGATION

TECHNICAL FIELD

The present invention relates to microstructured optical fibers and, more particularly, to the use of a section of microstructured fiber disposed in a signal path so as to be orthogonal to the direction of signal propagation, providing various optical effects to the propagating signal.

BACKGROUND OF THE INVENTION

Microstructured waveguides and, in particular, photonic crystals, are known to provide wavelength-dependent filters, beam splitters, mirror components, right-angle waveguides and the like. In particular, photonic crystal materials modify the spontaneous emission rate of excited atoms, where the spontaneous emission is inhibited when the embedded atom has an emission frequency in the bandgap of the material.

Since conventional microstructured optical elements consist of structures which have dimensions on the order of several wavelengths along each of the two major axes, and are made with conventional microprocessing techniques, optical processing systems employing these elements can be extremely small. These relatively small devices thus find a variety of uses in high bit rate optical transmission systems. In order to reduce coupling losses in transmission systems employing such devices, various in-line (or "in-fiber") devices have been developed. U.S. Pat. No. 6,075,915 issued to Koops et al. on Jun. 13, 2000 discloses the formation of a photonic crystal element directly in the path of light within an optical fiber. The Koops et al. photonic crystal element comprises an array of dielectric rods having one or more selective defects. Such a device is relatively difficult to form without adversely affecting the surrounding sections of optical fiber, or without introducing unwanted defects in the crystal area. Additionally, the number of rods and array size are naturally limited by the size of the fiber and the materials used to form the fiber.

Japanese Patent 2002-228808 issued to T. Mastoshi et al. on Aug. 14, 2002 discloses the function of "slicing" a photonic crystal fiber into a large number of sections, and using separate ones of these slices for the formation of the microstructured optical waveguides. Mastoshi et al. yield an improvement over the state of the art by following these fabrication steps (in sequence): (i) drawing the photonic fiber; (ii) polishing the fiber sides to make the rectangular cross-section; (iii) polishing the fiber ends to make the rectangular cross-section segments, and (iv) assembling the photonic circuit device by joining these segments together on a substrate. However, the actual technical implementations of the suggested procedure is rather difficult, as well as expensive and time consuming. For example, the surface quality of the sliced segments, as well as their interfaces, is extremely difficult to make sufficiently flat. The surface non-flatness will cause reflection and scattering of light and, as a result, will degrade the performance of the device. Also, for perfectly flat cuts, the light reflected from the sides of the slice will cause interference effect that will impact the transmission characteristics of the photonic device. Additionally, the process for assembling the fiber "slices" into larger photonic chips is not well-defined by Mastoshi et al and is not well-known in the art.

Thus, a need remains in the art for a relatively robust and cost-effective arrangement for utilizing complex microstructured elements with an optical transmission fiber.

SUMMARY OF THE INVENTION

The need remaining in the art is addressed by the present invention, which relates to microstructured optical fibers and, more particularly, to the use of a section of microstructured fiber disposed in the optical signal path so as to be orthogonal to the direction of signal propagation, thus forming a robust microstructured optical element that provides various optical effects to a propagating optical signal. A particular method of making a microstructured optical fiber is also disclosed.

In accordance with the present invention, an optical preform is formed to comprise a predetermined set of internal optical elements (e.g., layers, rings, etc. of material of different refractive indices from the matrix glass), as conventionally used in the prior art to form microstructured optical fiber. The outer surface of the structure may be cylindrical, rectangular or any other shape consistent with the desired nature of coupling light in a direction lateral to the axis of the final optical element. Subsequent to formation, the preform is subjected to a drawing process to reduce the dimensions of the preform a predetermined amount. In accordance with the present invention, the preform may be drawn down to the dimensions of a finished optical fiber, or any other dimension which provides the required size and spacing of the internal optical elements. Control of the internal pressure of holes during draw can be used to adjust the relative dimensions of hole size and spacing. The fiber from this draw is then sliced into a number of fiber segments, where each segment may comprise a height of nay desired amount, for example, anything between a few microns and few centimeters.

A fiber segment of the present invention has been found to exhibit exceptionally smooth sidewall interfaces that may then be used as the input and output ports, the properties of the sidewalls a result of the high temperature drawing step used to form the fiber. Light confinement along the vertical direction in a fiber segment of the present invention (if necessary) may be achieved not only by the total internal reflection from the top and bottom surfaces (as in the prior art thin optical microchips) but also by collimation of the incident light along the horizontal direction. If the width of the fiber segment is sufficiently small, or the fiber segment is post-processed to impart an axial variation, then collimation may not be required.

The fiber segment of the present invention may be "tuned", for example, in wavelength response, by imparting a strain of some sort to the segment, such as "stretching" the segment, twisting the segment or subjecting the segment to a change in temperature. In one embodiment utilizing microfluidic plugs included in the fiber segment structure, a change in pressure within the segment will provide wavelength tuning. It has also been found that one or more fiber segments of the present invention may be disposed alongside a transmission fiber, with evanescent coupling used to couple a propagating optical signal between the transmission fiber and the fiber segment(s).

In another embodiment of the present invention, the vertical sidewalls of a plurality of fiber segments may be polished so as to form a plurality of fiber segments with rectangular cross section. The polished segments may then be arranged in a suitable pattern (e.g., linear, two-dimensional array, three-dimensional array, etc.) so as to form a "complex" optical preform. The complex preform may then be subjected to a second drawing process, followed by a second slicing process, thus forming a plurality of fiber segments with a more complex internal structure.

It is an advantage of the process of the present invention that the use of a "two draw" process virtually eliminates any gaps between adjacent polished fiber segments (sometimes referred to as "stitching" problems in the prior art). In addition, due to the reduction of dimensions in the drawings process, the stitching accuracy is significantly improved over polishing of small elements.

Other and further arrangements and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
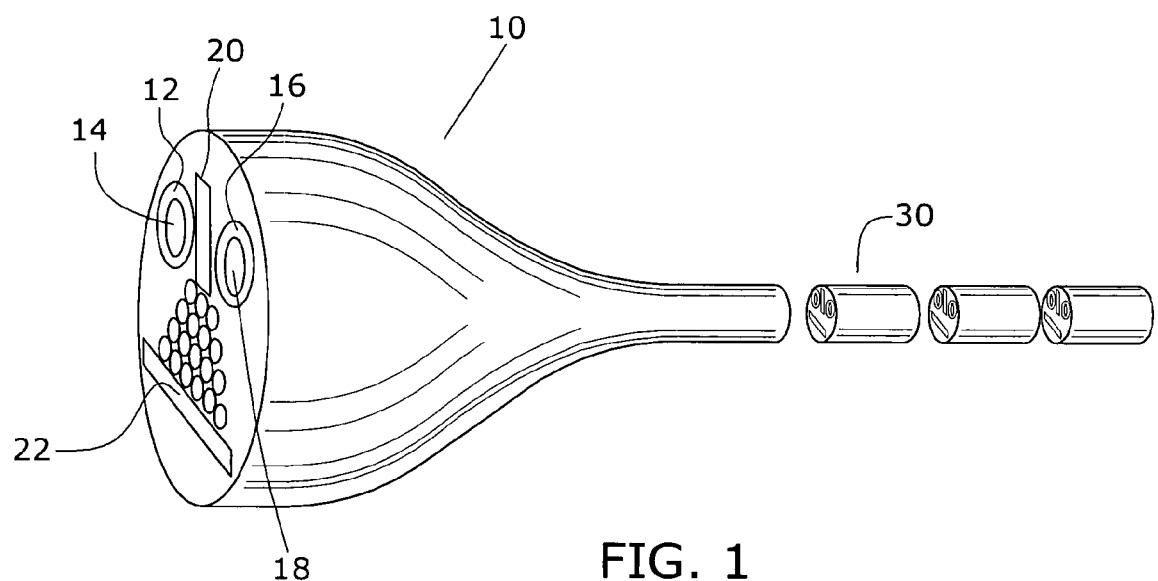
FIG. 1 illustrates an exemplary prior art optical preform used to form a microstructured optical fiber.

FIG. 1 illustrates an exemplary optical preform 10 used to form a microstructured fiber, employing processes well known in the art. Various techniques for forming microstructured optical fibers are well-known in art, where U.S. Pat. No. 5,802,236—herein incorporated by reference—describes various formation techniques. In general, one such microstructured fiber may comprise a core region (typically solid) surrounded by a cladding region that comprises a multiplicity of spaced-apart, non-periodically disposed cladding features. The features may comprise materials having a different refractive index (or other optical property) than the remainder of the cladding material. In the particular embodiment as shown in FIG. 1, a preform 10 includes a first cladding ring 12 surrounding a first "core" region 14, first cladding ring 12 comprising a material having a different index of refraction than core region 14. A second cladding ring 16 is formed at a different location within the cross-section of preform 10, surrounding another core region 18. A first longitudinal region 20 is illustrated as vertically disposed between cladding rings 12 and 16, and a second longitudinal region 22 is illustrated as horizontally disposed below cladding rings 12 and 16. As mentioned above, this particular arrangement is exemplary only and used for the purposes of discussion.

Figure 2:
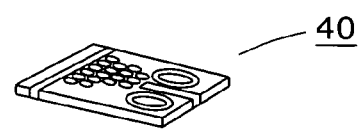
FIG. 2 illustrates an exemplary prior art microchip formed from the preform of FIG. 1.

As shown in FIG. 1, once preform 10 has been formed to include the various regions of different refractive index, the preform is subjected to a drawing process to reduce its outer diameter, and then cleaved into a plurality of separate microstructured sections 30. In following the conventional process of the prior art, each microstructured section 30 is then further divided into extremely thin (on the order of one micron) photonic microchips. One such prior art microchip 40 is illustrated in FIG. 2.

As mentioned above, there are many problems with this prior art process of forming microstructured optical elements, particularly related to cleaving, etching and polishing the separate elements. In contrast, the present invention is directed to the use of fiber segments which do not require confinement along the drawn fiber axis and as such exhibit an extended vertical dimension, as compared to the micron-sized microchips of the prior art. Moreover, a plurality of such fiber segments may be further processed, using a second drawing operation, to form a complex microstructured optical fiber, where the ability to form such a complex structure was extremely problematic in the prior art.

Figure 3:
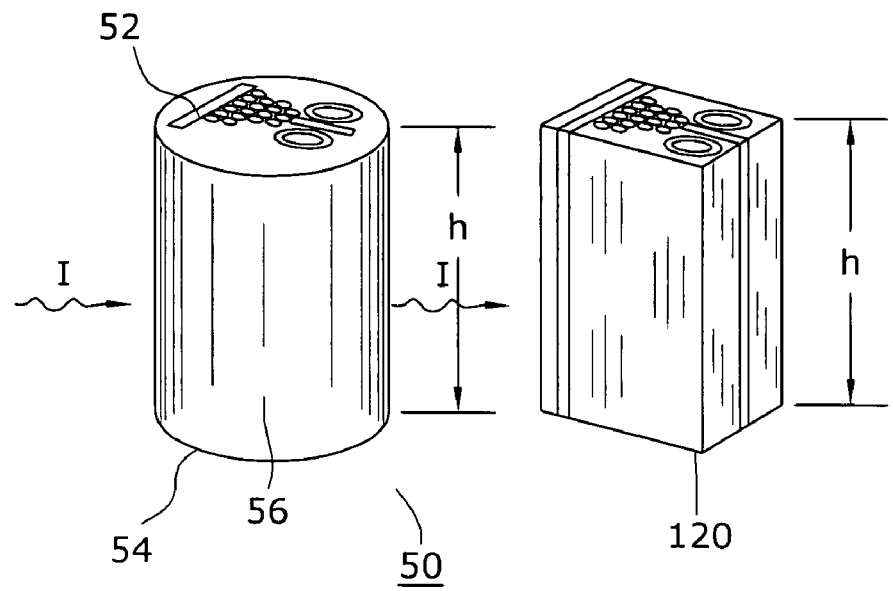
FIG. 3 illustrates an exemplary fiber segment formed in accordance with the present invention.

FIG. 3 illustrates an exemplary fiber segment 50 formed in accordance with the present invention. In particular, optical preform 10 as shown in FIG. 1 is drawn, using the method as described above. The drawn fiber is then sliced into separate fiber segments, where in accordance with the present invention, an exemplary fiber segment 50 may comprise a height h anywhere from several microns to several meters. The fiber segment 50 of the present invention is considered to differ from the prior art microchips (such as microchip 40 of FIG. 2) in a number of different respects. First, the "roughness" of top and bottom surfaces 52 and 54, respectively, of fiber segment 50 may not affect the transmission characteristics of light if a beam will propagate through the sidewall 56 of segment 50, instead of traversing through the longitudinal extent of segment 50. That is, in accordance with the present invention, a light wave will propagate parallel to top and bottom surfaces 52 and 54—through sidewall 56—as shown in FIG. 3. Since vertical sidewall 56 will be exceptionally smooth (as a result of the draw process), scattering losses into and out of fiber segment 50 will be minimal.

Figure 4:
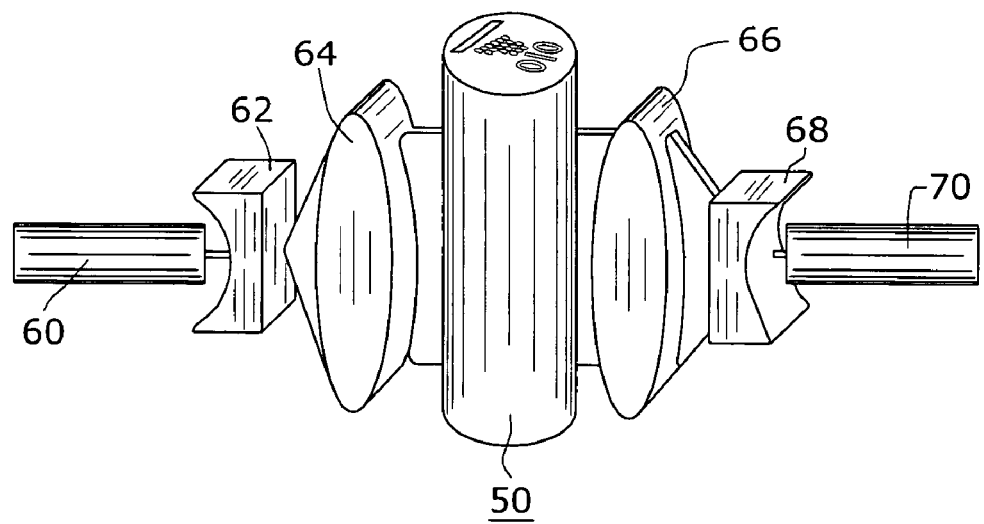
FIG. 4 contains an exemplary optical system including a fiber segment of the present invention.

Indeed, light confinement along the vertical direction of fiber segment 50 can be achieved by collimating the incident light along the horizontal direction, as compared to the use of total internal reflection within the thin, lithographically defined microchip of the prior art. FIG. 4 illustrates one exemplary optical system incorporating a fiber segment 50 formed in accordance with the present invention. In this example, an optical beam propagating along an input fiber 60 first passes through an input confocal lens 62 and collimating lens 64 before entering fiber segment 50. As discussed above, fiber segment 50 may be formed to comprise a variety of different internal optical elements so as to perform any desired modifications to the optical signal passing therethrough. A collimated signal will thereafter exit fiber segment 50, pass through an output collimating lens 66 and confocal lens 68 before being coupled into an output fiber 70.

Figures 5, 6, 7:
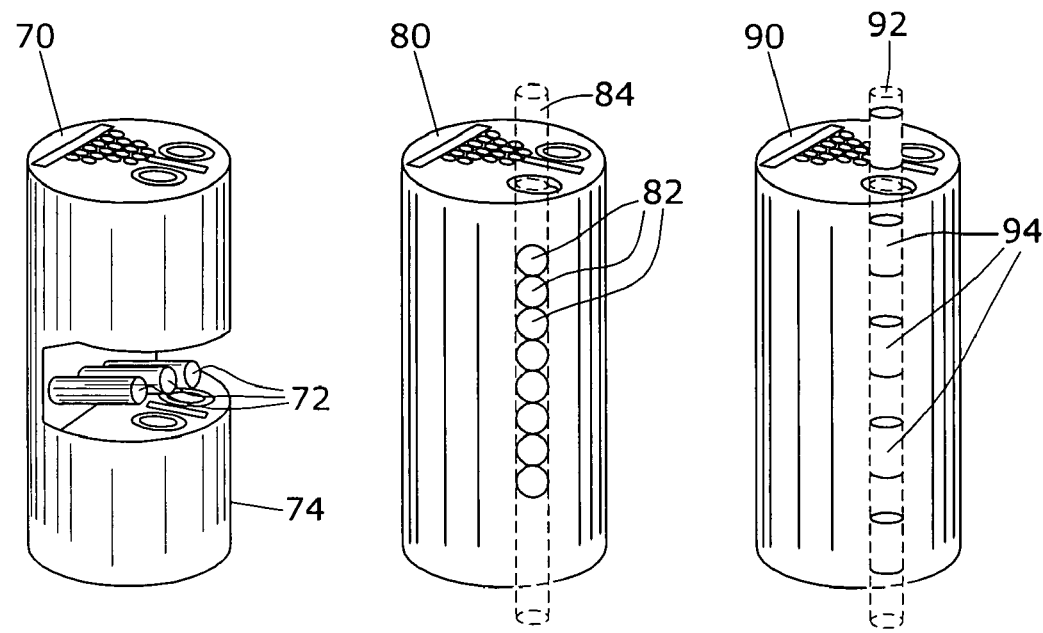
FIGS. 5–7 illustrate different embodiments of fiber segments that may be formed in accordance with the present invention.

As a result of the relatively large size of the fiber segment structure of the present invention, a number of different modifications can be made to modify its optical characteristics, where such modifications would be essentially impossible in the thin microchip design of the prior art. For example, FIG. 5 illustrates the inclusion of a three-dimensional structure 72 within a fiber segment 70. In this case, a plurality of cylinders are etched into—but not through—sidewall 74 of fiber segment 70. FIG. 6 illustrates an alternative embodiment where a plurality of spherical elements 82 are disposed within a cylindrical aperture 84 formed within a fiber segment 80. An alternative use of a cylindrical aperture is illustrated in fiber segment 90 of FIG. 7, where an exemplary aperture 92 is formed to include a plurality of micro-fluidic plugs 94, where such plugs are known to induce a change in refractive index, as a function of the material used to form the plugs, the distance between the plugs, the temperature of the plugs, etc. In general, apertures may be formed within a fiber segment of the present invention and thereafter filled with a material(s) having a different refractive index, the material comprising a gas, solid or liquid, as desired.

In each of the embodiments as shown in FIGS. 5–7, as well as any other embodiment, the fiber segment structure of the present invention may be subjected to a physical "strain" so as to provide wavelength-sensitive tuning of the operating characteristics of the fiber segment. For example, a fiber segment may be "stretched" vertically to modify the wavelength sensitivity, twisted about the central vertical axis, or subjected to changes in ambient temperature. For an arrangement such as that illustrated in FIG. 7, changes in pressure will modify the spacing between the micro-fluidic plugs and thus change the wavelength sensitivity of the fiber segment.

Figure 8:
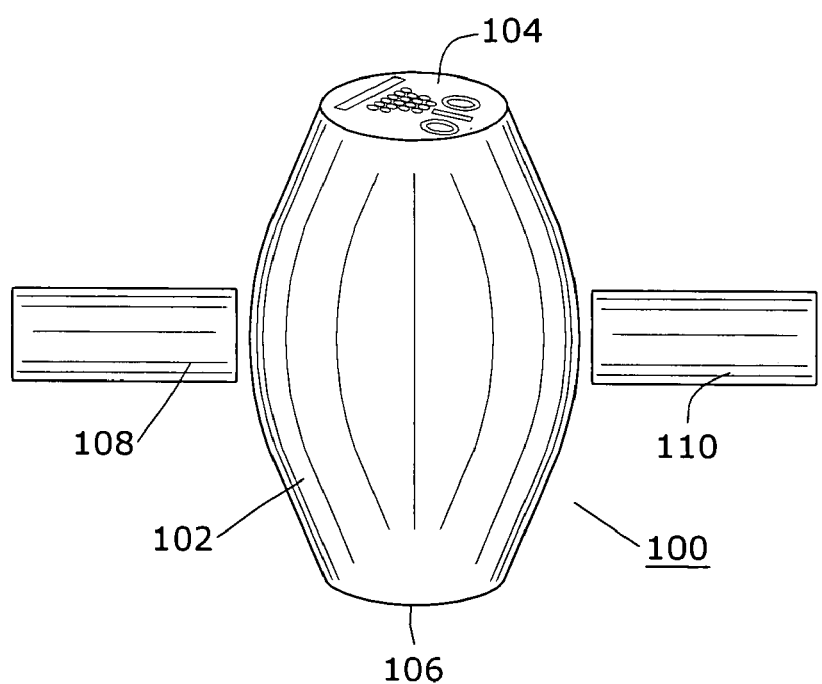
FIG. 8 illustrates an exemplary fiber segment that has been modified to exhibit a tapered profile from its midsection toward each endface.
Figure 9:
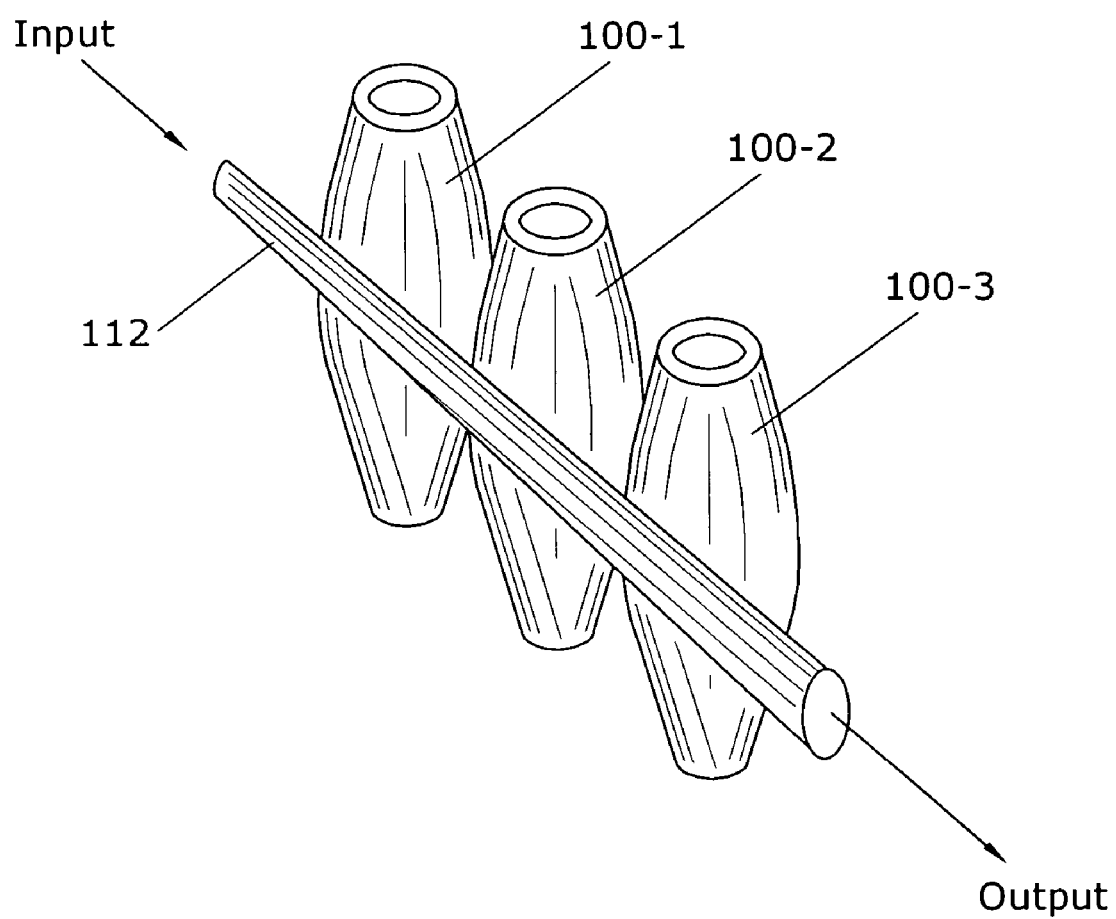
FIG. 9 illustrates an exemplary optical system using a set of tapered fiber segments, the tapered segments disposed adjacent to a transmission fiber and using evanescent coupling to optically couple a propagating signal between the fiber and the tapered segments.

An alternative geometry of a fiber segment of the present invention is illustrated in FIG. 8. In this example, a fiber segment 100 has been modified to include tapered regions between a central portion 102 and the opposing endfaces 104 and 106. This particular geometry will therefore naturally form focusing and confinement of light between input and output fibers 108, 110 and fiber segment 100. FIG. 9 illustrates an exemplary optical system utilizing a set of such tapered fiber segments 100. In this case, a set of three tapered fiber segments 100-1, 100-2 and 100-3 are disposed alongside a transmission fiber 112. In this example, therefore, evanescent coupling is used to provide optical coupling between a signal propagating along fiber 112 and the set of tapered fiber segments.

Figure 10:
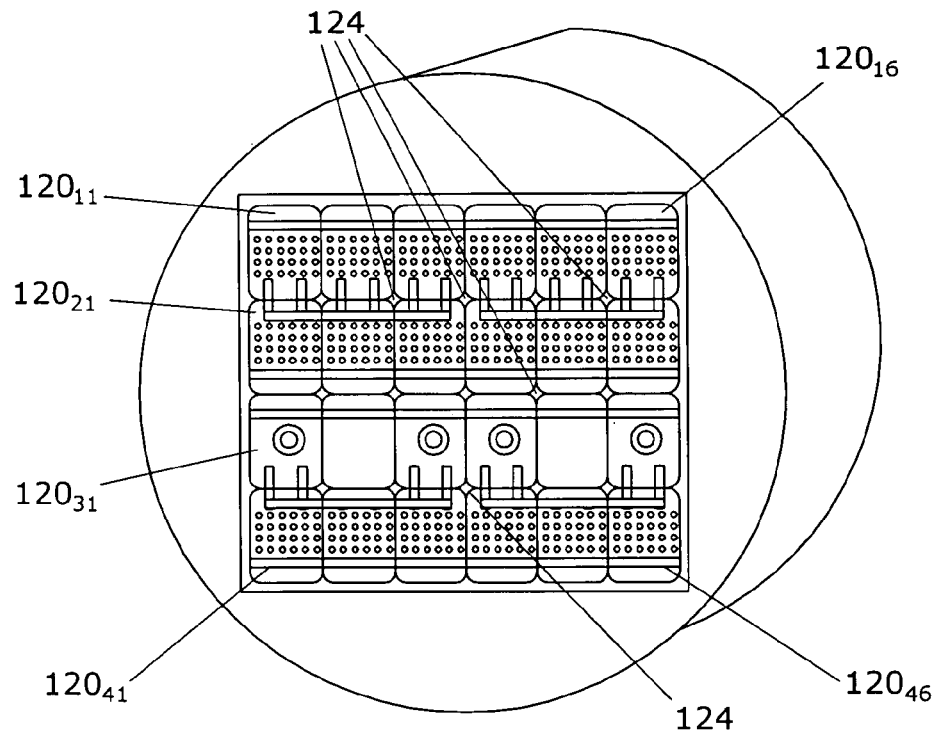
FIG. 10 illustrates an exemplary complex microstructured optical preform formed from a plurality of polished fiber segments of the present invention.

FIG. 10 illustrates an exemplary complex microstructured optical preform 122 comprising a plurality of separate polished fiber segments 120. In the particular arrangement of FIG. 10, fiber segments 120 are arranged in a two-dimensional array, displaying segments enumerated as, for example, $120_{11}$, $120_{16}$, $120_{21}$, $120_{41}$, $120_{46}$, and so on. Advantageously, the use of polished, fiber segments allows for the separate elements to be easily arranged to provide the desired optical characteristics. Indeed, each separate fiber segment may exhibit different optical characteristics, or various subsets of segments within an array may exhibit different characteristics, allowing an individual to "tailor" the desired characteristics of a complex microstructured element.

Figure 11:
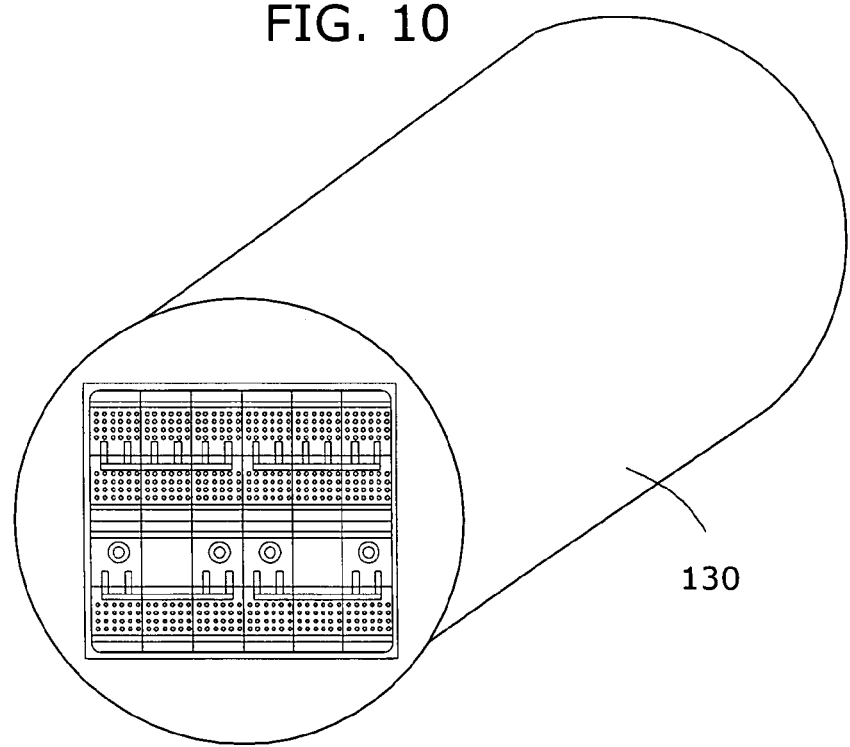
FIG. 11 illustrates an exemplary complex fiber structure formed by subjecting the arrangement of FIG. 10 to a second drawing process.
Figure 12:
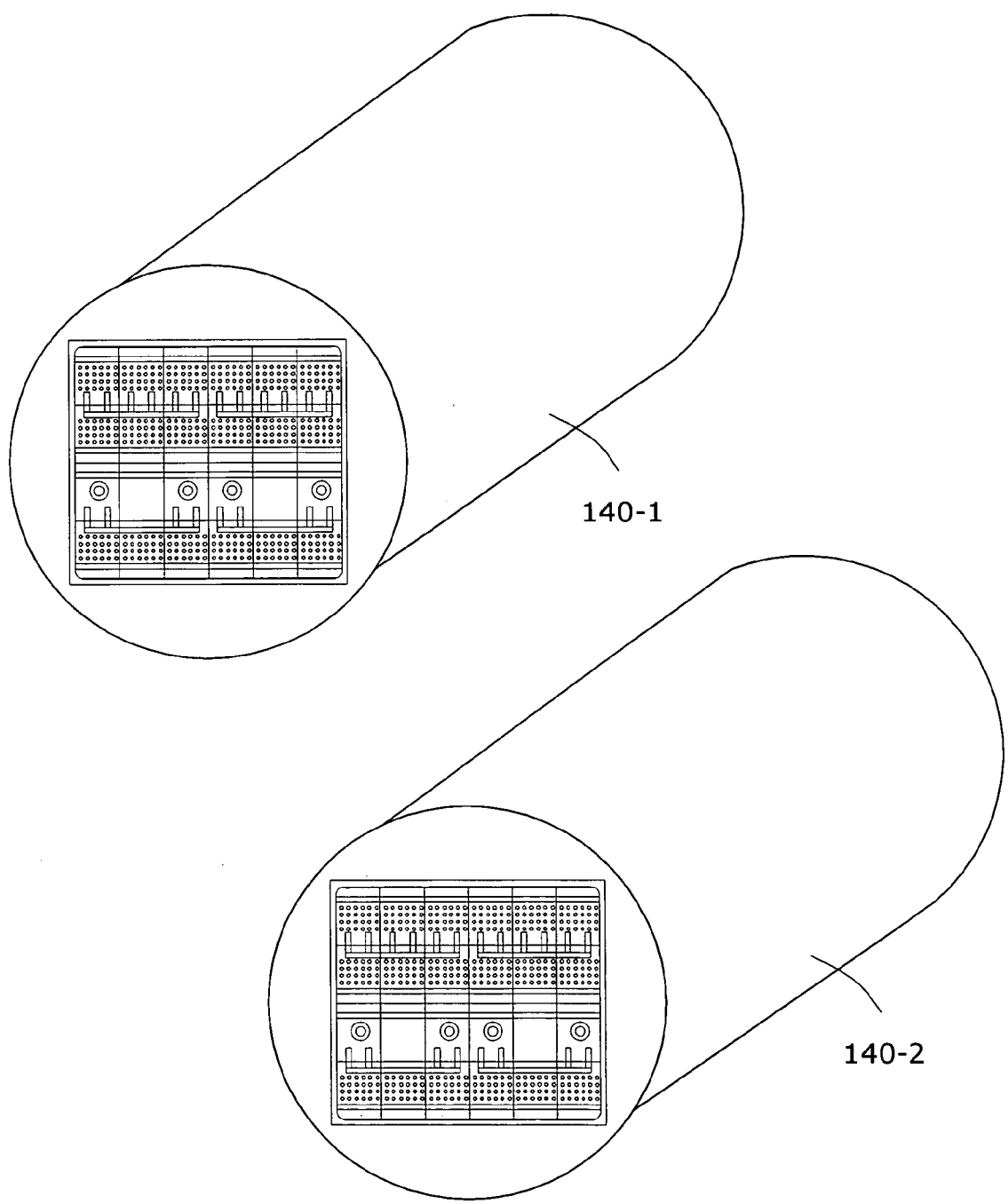
FIG. 12 illustrates an exemplary complex fiber segment of the present invention, formed by slicing the drawn structure of FIG. 11.

As shown in FIG. 10, the array arrangement of fiber segments 120 includes a plurality of gaps 124 between adjacent segments, since the polished sides are not perfectly flat. Therefore, in accordance with the present invention, a second fiber drawing process is then performed to drawn down the array arrangement, as shown in FIG. 11, to form a complex microstructured fiber 130. In accordance with the present invention, the use of this second draw functions to decrease the overall dimensions of the final device and virtually eliminate the gaps between adjacent fiber segments 120 (these gaps commonly referred to in the art as "stitching defects"). After this second draw step is performed, the fiber may be sliced into complex-structured fiber segments 140-1 and 140-2, as shown in FIG. 12, in a manner similar to the simpler fiber segment structure discussed above. Indeed, the complex structured fiber segment may be used in all of the various embodiments as discussed above.

What is claimed is:

1. A microstructured optical fiber component comprising
a first internal portion exhibiting a first refractive index;
a plurality of regions exhibiting various, predetermined refractive indicies, the plurality of regions arranged to provide modifications to an optical signal passing therethrough

CHARACTERIZED IN THAT the microstructured optical fiber component is formed to comprise a fiber segment by drawing from a preform of similar pattern and is defined by a pair of endfaces with predetermined height vertical sidewalls therebetween, the vertical sidewalls comprising an input port and an output port for the microstructured optical fiber component such that the endfaces are disposed orthogonal to the direction of optical signal propagation and do not significantly affect the behavior of the light passing through the vertical sidewalls thereof between the input port and the output port, in a direction parallel to the endfaces;

wherein the sidewalls of the fiber segment are tapered from the center region toward the endfaces to alter the lateral behavior of an optical signal passing through the input and output ports of said tapered sidewalls.

2. The microstructured optical fiber of claim 1 wherein the fiber segment comprises at least one aperture formed through the vertical extent thereof, said at least one aperture filled with a gas, liquid or solid.

3. The microstructured optical fiber of claim 2 wherein one or more optical elements are disposed within the at least one aperture.

4. The microstructured fiber of claim 3 wherein a plurality of solid plugs is disposed within at least one aperture.

5. The microstructured optical fiber of claim 3 wherein one or more micro-fluidic plugs of material with a known refractive index is inserted in at least one aperture.

6. The micro structured optical fiber of claim 1 wherein one or more microstructures are formed through at least a portion of the vertical extent of the fiber segment.

7. The microstructured optical fiber of claim 6 wherein at least one microstructure comprises a plurality of etched cylindrical elements formed to be parallel to the endfaces of the component.

* * * * *